United States Patent [19]

Drexler et al.

[11] Patent Number: 4,558,090
[45] Date of Patent: Dec. 10, 1985

[54] WATER-DILUTABLE COATING AGENT FOR PREPARING THE BASE LAYER OF A MULTILAYER COATING

[75] Inventors: Hermann-Josef Drexler, Guntersleben; Franz Ebner, Kist; Hans-Dieter Hille, Berg. Gladbach; Ulrich Poth, Münster, all of Fed. Rep. of Germany

[73] Assignee: BASF Farben & Fasern AG, Hamburg, Fed. Rep. of Germany

[21] Appl. No.: 657,063

[22] Filed: Oct. 2, 1984

Related U.S. Application Data

[62] Division of Ser. No. 467,865, Feb. 18, 1983, Pat. No. 4,489,135.

[30] Foreign Application Priority Data

Mar. 19, 1982 [DE] Fed. Rep. of Germany ....... 3210051

[51] Int. Cl.[4] ............................................. C08J 75/00
[52] U.S. Cl. .................. 524/591; 427/407.1; 525/124; 525/127; 525/131; 525/440; 525/453; 525/454; 525/460
[58] Field of Search ................. 524/591; 525/127, 131, 525/440, 403, 410, 454, 124, 460, 453

[56] References Cited

U.S. PATENT DOCUMENTS

| | | | |
|---|---|---|---|
| 4,092,286 | 5/1978 | Noll et al. .................... 427/385.5 X |
| 4,132,686 | 1/1979 | Toyoshima et al. ......... 427/407.1 X |
| 4,254,168 | 3/1981 | Monson ........................... 427/409 |
| 4,321,173 | 3/1982 | Schumacher et al. .............. 525/453 |
| 4,375,498 | 3/1983 | Le Minez et al. .................. 428/416 |
| 4,382,114 | 5/1983 | Hohlein et al. .................. 428/423.1 |

*Primary Examiner*—Thurman K. Page
*Attorney, Agent, or Firm*—Wells & Wells

[57] ABSTRACT

A water-dilutable coating agent for preparing the base layer of a multilayer coating. The coating agent contains pigments and optionally flow-control agents, thixotroping agents, fillers, organic solvents and other customary auxiliaries. The coating agent contains as a binder an aqueous polyuretane dispersion which has a polyuertane resin acid number of 5 to 70 and which as been prepared by reacting:

(A) a linear polyether diol and/or polyester diol having terminal hydroxyl groups and a molecular weight of 400 to 3,000 with (B) a diisocyanate in such a molar ratio that an intermediate product is formed which has terminal isocyanate groups, (C) and reacting the intermediate product with a compound which has two groups which are reactive toward isocyanate groups and at least one group which is capable of forming an anion and which has been neutralized with a tertiary amine before the reaction, converting the second intermediate product, obtained from (A), (B) and (C) into a predominantly aqueous phase and (D) reacting the isocyanate groups which are still present with a diamine and/or polyamine having primary and/or secondary amino groups.

7 Claims, No Drawings

WATER-DILUTABLE COATING AGENT FOR PREPARING THE BASE LAYER OF A MULTILAYER COATING

This application is a division of application Ser. No. 467,865, filed Feb. 18, 1983, and now U.S. Pat. No. 4,489,135.

BACKGROUND OF THE INVENTION

The invention relates to a water-dilutable coating agent for preparing the base layer of a multilayer coating and which contains pigments, if desired, flow-control agents, thixotroping agents, fillers, organic solvents and other customary auxiliaries, and to a process for preparing a multilayer coating.

It is known in particular in the coating of motor cars but also in other areas where coatings are desired which have a good decorative effect and at the same time good corrosion protection, to provide substrates with several coating layers which are arranged on top of one another. In this method, a pigmented coating agent is first applied, followed by a transparent topcoat, i.e. as a rule a clear coating, which does not contain any or only transparent pigments.

Metallic pigments which lead to metallic coatings are frequently used in the base layer. The automotive industry has hitherto used in the coating of motor cars conventional coating agents, which have a high organic solvent content. For economic reasons, and to reduce environmental pollution, there is a trend to avoid, as far as possible, organic solvents in coating compositions.

For this reason coating agents have been disclosed which predominantly contain water as the solvent or dispersant and which contain only small amounts of organic solvents. For instance, German Offenlegungsschrift No. 2,926,584 describes an aqueous binder mixture for preparing metallic base coats, which contains as binder a water-soluble condensation product of a polyester, a polycarboxylic acid mixture containing trimelitic acid, an epoxidized oil and basic compounds.

SUMMARY OF THE INVENTION

It has now been found, surprisingly, that coating agents for preparing the base layer of a multilayer coating are obtained with very good properties when these coating agents contain as binder a certain aqueous polyurethane dispersion. The binders according to the invention give, in particular when metallic pigments are used, coatings which have a particularly good metallic effect, since they lead to a very favorable arrangement and fixation of the metallic pigments in the paint film. Even when conventional, nonmetallic, pigments are used coatings are obtained which have an excellent decorative effect. The coating agents have a particular advantage in that on application of a further coating layer to the predried but not yet baked film they dissolve only to a very small extent or, in some cases, not at all.

The invention accordingly relates to a coating agent of the type mentioned in the introduction, which contains as a binder an aqueous polyurethane dispersion having a polyurethane resin acid number of 5 to 70 and which has been prepared by reacting (A) a linear polyetherdiol and/or polyesterdiol having terminal hydroxyl groups and a molecular weight of 400 to 3,000 with (B) a diisocyanate in such a molar ratio that an intermediate product is formed which has terminal isocyanate groups, (C) and reacting the intermediate product with a compound which has two groups which are reactive toward isocyanate groups and at least one group which is capable of forming an anion and which has been neutralized with a tertiary amine before the reaction, converting the second intermediate product, obtained from (A), (B) and (C), into a predominantly aqueous phase and (D) reacting the isocyanate groups which are still present with a diamine and/or polyamine having primary and/or secondary amino groups.

DESCRIPTION OF THE PREFERRED EMBODIMENTS

Polyetherdiols which are suitable for use as component (A) are of the general formula:

in which R=hydrogen or a lower alkyl radical which is unsubstituted or substituted by different substituents, n=2 to 6 and m=10 to 50 or more. Examples are poly(oxytetramethylene) glycols, poly(oxyethylene) glycols and poly(oxypropylene) glycols.

The preferred polyalkylene ether polyols are poly(oxypropylene) glycols having a molecular weight within a range from 400 to 3,000.

Polyesterdiols can also be used as a polymeric diol component (component A) in the invention. The polyesterdiols can be prepared by esterifying organic dicarboxylic acids or their anhydrides with organic diols. The dicarboxylic acids and the diols can be aliphatic or aromatic dicarboxylic acids and diols.

The diols used to prepare the polyesters include alkylene glycols, such as ethylene glycol, butylene glycol, neopentylglycol and other glycols, such as dimethylolcyclohexane.

The acid component of the polyester consists primarily of low molecular weight dicarboxylic acids or their anhydrides which have 2 to 18 carbon atoms in the molecule.

Examples of suitable acids are phthalic acid, isophthalic acid, terephthalic acid, tetrahydrophthalic acid, hexahydrophthalic acid, adipic acid, azelaic acid, sebacic acid, maleic acid, glutaric acid, hexachloroheptanedicarboxylic acid and tetrachlorophthalic acid. These acids can also be replaced by their anhydrides insofar as these exist.

Furthermore, it is also possible, for the purposes of the invention, to use polyesterdiols which are derived from lactones as component A. These products are obtained, for example, by reacting an ε-caprolactone with a diol. U.S. Pat. No. 3,169,945 describes such products.

The polylactonepolyols which are obtained by this reaction are distinguished by the presence of a terminal hydroxyl group and by recurring polyester fractions which are derived from the lactone. These recurring molecular fractions can be of the formula

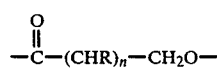

in which n is preferably 4 to 6, and the substituent is hydrogen, an alkyl radical, a cycloalkyl radical or an alkoxy radical and does not contain more than 12 carbon atoms, and the total number of carbon atoms in the substituent in the lactone ring does not exceed 12.

The lactone used as a starting material can be any desired lactone or any desired combination of lactones, but this lactone should contain at least 6 carbon atoms in the ring, for example 6 to 8 carbon atoms, and at least 2 hydrogen substituents should be present on the carbon atom which is bonded to the oxygen group of the ring. The lactone used as a starting material can be represented by the following general formula:

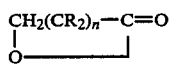

in which n and R have the abovementioned meaning.

According to the invention, the lactones preferred for preparing the polyesterdiols are ε-caprolactones, where n has a value of 4. The most preferred lactone is unsubstituted ε-caprolactone, where n has a value of 4 and all R substituents are hydrogen. This lactone is particularly preferable, since it is available in substantial quantities and gives coatings having excellent properties. It is also possible to use various other lactones either on their own or combined.

Examples of aliphatic diols suitable for the reaction with the lactone include ethylene glycol, 1,3-propanediol, 1,4-butanediol and dimethylolcyclohexane.

Any desired organic diisocyanate can be used as component (B) for preparing the polyurethane dispersion. Examples of suitable diisocyanates are trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4'-biphenylene diisocyanate, 1,5-naphthylene diisocyanate, 1,4-naphthylene diisocyanate, 1-isocyanatomethyl-5-isocyanato-1,3,3-trimethylcyclohexane, bis-(4-isocyanatocyclohexyl)-methane, bis-(4-isocyanatophenyl)-methane, 4,4'-diisocyanatodiphenyl ether and 2,3-bis-(8-isocyanarooctyl)-4-octyl-5-hexylcyclohexene.

The reaction of component (A) with diisocyanate is carried out in such a way that the resulting first intermediate product has terminal isocyanate groups, i.e. the diisocyanate is used in excess.

According to the invention, the compounds used as component (C) have 2 groups which react with isocyanate groups and at least one group capable of forming an anion. Groups suitable for reacting with isocyanate groups are in particular hydroxyl groups and primary and secondary amino groups. Groups capable of forming an anion are in particular carboxyl and sulfonic acid groups. Before the reaction these groups are neutralized with a tertiary amine in order to avoid a reaction with the isocyanate groups. The reaction is carried out in such a way that a second intermediate product having terminal isocyanate groups is formed. The molar amounts of the reactants are thus chosen in such a way that the first intermediate product is present in excess.

Examples of compounds suitable for use as a compound having at least 2 groups which react with isocyanate groups and at least 1 group capable of forming an anion are dihydroxypropionic acid, dimethylolpropionic acid, dihydroxysuccinic acid and dihydroxybenzoic acid. Other suitable compounds are the polyhydroxy acids which can be prepared by oxidizing monosaccharides, for example gluconic acid, saccharic acid, mucic acid, glucuronic acid and the like.

Examples of amino-containing compounds are α,β-diaminovaleric acid, 3,4-diaminobenzoic acid, 2,4-diaminotoluene-5-sulfonic acid, 4,4'-diaminodiphenylether-sulfonic acid and the like.

The intermediate product obtained from (A), (B) and (C) has anionic groups which are neutralized with a tertiary amine. Examples of suitable tertiary amines are trimethylamine, triethylamine, dimethylaniline, diethylaniline, triphenylamine and the like. The product is transferred to an aqueous phase, and gives a finely divided polyurethane dispersion.

After the second intermediate product has been transferred into the aqueous phase the isocyanate groups still present are reacted with a primary or secondary diamine (component D) as a chain-lengthening agent to give N-alkylurea groups. Examples of diamines suitable for this purpose are ethylenediamine, diaminopropane, hexamethylenediamine, hydrazine, aminoethylethanolamine and the like. The reaction with the diamine increases the degree of bonding and the molecular weight.

It is advantageous to replace some of component (C) by a compound (E) which has two groups which are reactive toward isocyanate groups and which is free of groups capable of forming an anion. This allows the ionic group content in the polyurethane resin to be adjusted as desired. Component (D) is preferably used in such an amount that the polyurethane resin has an acid number of 5 to 70, particularly preferably of 12 to 30. Examples of compounds which are suitable for use as component (E) are low molecular weight diols or diamines having primary or secondary amino groups.

The coating agents according to the invention have better pigmentability than other aqueous dispersions. In particular, they produce a good effect when metallic pigments are used. These advantages are due to the polyurethane dispersion described above, and which is thus an essential component of the coating agent. Even though the favorable properties are obtained when the polyurethane dispersion is used as the sole binder, it is nevertheless in many cases desirable to modify coating agents or to improve them in respect of certain properties by concomitantly using other binders or hardening components.

The coating agents advantageously contain as an additional binder component a water-dilutable melamine resin in an amount of 1 to 80% by weight, preferably 20 to 60% by weight, relative to the solids content of the polyurethane dispersion.

Water-soluble melamine resins are known per se and are extensively used. They are etherified melamine/formaldehyde condensation products. Their degree of solubility in water depends not only on the degree of condensation, which should be as low as possible, but also on the etherification component, because only the lowest members of the alkanol or ethylene glycol monoether series give water-soluble condensates. Hexamethoxymethylmelamine resins are the most important ones. If solubilizers are used it is also possible to disperse butanol-etherified melamine resins in an aqueous phase.

It is also possible to insert carboxyl groups into the condensate. Transetherification products of highly etherified formaldehyde condensates with hydroxycarboxylic acids are water-soluble after neutralization because of their carboxyl group, and can be used as a crosslinking component in the coating agents according to the invention.

The melamine resins described can also be replaced by other water-soluble or water-dispersible amino resins, such as, for example, benzoguanamine resins.

In the case where the coating agent according to the invention contains a melamine resin, it can advantageously also contain, as a further binder component, a waterdilutable polyester resin and/or a water-dilutable polyacrylate resin, provided the weight ratio of melamine resin to polyester/polyacrylate resin is 2:1 to 1:4 and the total amount of melamine resin and polyester/polyacrylate resin, relative to the solids content of the polyurethane dispersion, is 1 to 80% by weight, preferably 20 to 60% by weight.

Water-dilutable polyesters are those which have free carboxyl groups, i.e. polyesters which have a high acid number. In principle there are two known methods of introducing the carboxyl groups required into the resin system. The first method consists in terminating the esterification at the acid number desired. Neutralized with bases the polyesters thus obtained are soluble in water and form a film on baking. The second possibility consists in forming partial esters of dicarboxylic or polycarboxylic acids with hydroxyl-rich polyesters which have a low acid number. This reaction is usually carried out with those anhydrides of the dicarboxylic acids which react with the hydroxyl component under mild conditions to give a free carboxyl group.

The water-dilutable polyacrylate resins, like the polyester resins described above, contain free carboxyl groups. They are as a rule acrylic or methacrylic copolymers, and the carboxyl groups stem from the acrylic or methacrylic acid portions.

It is also possible to use blocked polyisocyanates as crosslinking agents. For the purposes of the invention any desired polyisocyanate can be used where the isocyanate groups have been reacted with a compound, so that the blocked polyisocyanate formed is stable to hydroxyl groups at room temperature but reacts with them at elevated temperatures, as a rule within a range from about 90° to about 300° C. The blocked polyisocyanates can be prepared from any desired organic polyisocyanate which is suitable for crosslinking. Those isocyanates are preferred which contain about 3 to about 36, in particular about 8 to 15, carbon atoms. Examples of suitable diisocyanates are the abovementioned diisocyanates (component B).

It is also possible to use polyisocyanates of higher isocyanate functionality. Examples of such polyisocyanates are tris-(4-isocyanatophenyl)-methane, 1,3,5-triisocyanatobenzene, 2,4,6-triisocyanatotoluene, 1,3,5-tris-(6-isocyanatohexyl)-biuret, bis-(2,5-diisocyanato-4-methylphenyl)methane and polymeric polyisocyanates, such as dimers and trimers of diisocyanatotoluene. Further, it is also possible to use mixtures of polyisocyanates.

Organic polyisocyanates which, for the purposes of the invention, are suitable for use as crosslinking agents can even be prepolymers which are derived, for example, from a polyol, including a polyether-polyol, or from a polyester-polyol. In this derivation reaction, as is known, polyols are reacted with an excess of polyisocyanates, thereby forming prepolymers having terminal isocyanate groups. Examples of polyols which can be used for this purpose are simple polyols, such as glycols, for example ethylene glycol and propylene glycol, or other polyols, such as glycerol, trimethylolpropane, hexanetriol and pentaerythritol, also monoethers, such as diethylene glycol and tripropylene glycol, and polyethers which are condensates of such polyols with alkylene oxides. Examples of alkylene oxides which are suitable for being condensed with these polyols to give polyethers are ethylene oxide, propylene oxide, butylene oxide and styrene oxide. These condensates are generally referred to as polyethers having terminal hydroxyl groups. They can be linear or branched. Examples of such polyethers are polyoxyethylene glycol having a molecular weight of 1,540, polyoxypropylene glycol having a molecular weight of 1,025, polyoxytetramethylene glycol, polyoxyhexamethylene glycol, polyoxynonamethylene glycol, polyoxydecamethylene glycol, polyoxydodecamethylene glycol and mixtures thereof. It is also possible to use other types of polyoxyalkylene glycol ethers. Those polyetherpolyols are particularly suitable which are obtained by reacting such polyols, such as ethylene glycol, diethylene glycol, triethylene glycol, 1,4-butanediol, 1,3-butanediol, 1,6-hexanediol and mixtures thereof, glyceroltrimethylolethane, trimethylolpropane, 1,2,6-hexanetriol, dipentaerythritol, tripentaerythritol, polypentaerythritol, methyl glucosides and sucrose, with alkylenes, such as ethylene oxide, propylene oxide or mixtures thereof.

Any desired suitable aliphatic, cycloaliphatic or aromatic alkyl monoalcohol can be used for blocking the polyisocyanates. Examples thereof are aliphatic alcohols, such as methyl, ethyl, chloroethyl, propyl, butyl, amyl, hexyl, heptyl, octyl, nonyl, 3,3,5-trimethylhexyl, decyl and lauryl alcohol, cycloaliphatic alcohols, such as cyclopentanol and cyclohexanol, aromatic alkyl alcohols, such as phenylcarbinol and methylphenylcarbinol. It is also possible, if desired, to use small amounts of high molecular weight and relatively involatile monoalcohols, which, after they have been split off, act as plasticizers in the coatings.

Other suitable blocking agents are oximes, such as methyl ethyl ketonoxime, acetonoxime and cyclohexanoneoxime, and also caprolactams, phenols and hydroxamates. Preferable blocking agents are malonates, acetoacetates and $\beta$-diketones.

The blocked polyisocyanates are prepared by reacting such an amount of an alcohol with the organic polyisocyanate that there are no free isocyanate groups left over.

The coating agents according to the invention can contain any pigment or dyestuff known and customary in the paint industry.

Specific examples of the dyestuffs or pigments, which can be of inorganic or organic type, are titanium dioxide, graphite, carbon black, zinc chromate, strontium chromate, barium chromate, lead chromate, lead cyanamide, lead silicochromate, zinc oxide, cadmium sulfide, chromium oxide, zinc sulfide, nickel titanium yellow, chrome titanium yellow, iron oxide red, iron oxide black, ultramarine blue, phthalocyanine complexes, naphthol red, quinacridones, halogenated thioindigo pigments and the like.

The pigments used particularly preferably are metal powders on their own or mixed with copper, copper alloys, aluminum and steel, preferably aluminum powder, in at least the predominant portion, namely in an amount of 0.5 to 25% by weight, relative to the total binder solids content of the coating agents. When the polyurethane dispersion is the sole binder, those commercially available metal powders are preferred for use as metallic pigments which have been specifically pretreated for aqueous systems.

The metal powders can also be used together with one or more of the abovementioned non-metallic pigments or dyestuffs. In this case the metallic powder content is chosen in such a way that the desired metallic effect is not suppressed.

The coating agents according to the invention can also contain further customary additives, such as solvents, fillers, plasticizers, stabilizers, wetting agents, dispersing auxiliaries, flow-control agents, defoamers and catalysts, singly or mixed, in the customary amounts. These substances can be added to the individual components and/or to the total mixture.

Examples of suitable fillers are talc, mica, kaolin, chalk, quartz powder, asbestos powder, slate powder, barium sulfate, various silicas, silicates, glass fibers, organic fibers and the like.

In addition to water, the coating agents according to the invention can contain customary solvents, for example aliphatic or aromatic hydrocarbons, monohydric or polyhydric alcohols, ethers, esters, glycol ethers and esters thereof, and ketones, such as, for example, toluene, xylene, butanol, ethylglycol, butylglycol (=ethylene glycol monoethyl or monobutyl ether) and acetates thereof, butyldiglycol (ethylene glycol dibutyl ether), ethylene glycol dimethyl ether, diethylene glycol dimethyl ether, cyclohexanone, methyl ethyl ketone, acetone, isophorone or mixtures thereof.

The coating agents are prepared as follows:

First a finely divided aqueous polyurethane dispersion is prepared from the abovementioned components (A), (B), (C), (D) and, if desired, (E). The components are reacted with one another by well-known methods of organic chemistry. Namely, first the polyether diol or polyester diol, the diisocyanate and the components (C) and, if desired, (E), which are bifunctional toward isocyanate groups, are reacted with one another in organic solvents, after the groups of component (C) which are capable of forming an anion have beforehand been neutralized with a tertiary amine. The reaction is carried out by first reacting components (A) and (B) with each other and then with (C) and (E), or the said components can be reacted at one and the same time. The product obtained is then transferred into an at least predominantly aqueous phase, and the isocyanate groups still present are reacted with a diamine and/or polyamine having primary and/or secondary amino groups. After the pH value of the resulting polyurethane dispersion has been checked and, if necessary, adjusted to a value between 6 and 9, the dispersion forms the basis of the coating agents according to the invention into which the remaining components, such as, for example, additional binders, pigments, organic solvents and auxiliaries are homogeneously incorporated by dispersing the mixture, for example by means of a stirrer or dissolver. Finally, the pH value is checked again and, if necessary, adjusted to a value of 6 to 9, preferably 7.0 to 8.5. The solids content and the viscosity are also adjusted, namely to values which are adapted to the particular application conditions.

Ready-to-use coating agents have as a rule a solids content of 10 to 30% by weight, and their ISO cup 4 efflux time is 15 to 30 seconds, preferably 18 to 25 seconds. Their water content is 60 to 90% by weight, and their organic solvent content is 0 to 20% by weight, in each case relative to the total coating agent.

Coating agents according to the invention are thus used to prepare the base layer of a multilayer coating. Any known unpigmented or only transparently pigmented coating agent is in principle suitable for use as topcoat. It can be a conventional solvent-containing varnish, water-dilutable varnish or powder varnish.

The invention also relates to a process for preparing a multilayer coating, in which a substrate is coated with a base layer of a water-dilutable coating agent which contains pigments and, if desired, flow-control agents, thixotroping agents, fillers, organic solvents and other customary auxiliaries. In the process the coating agent for the base layer contains as a binder an aqueous polyurethane dispersion which has been prepared by reacting (A) a linear polyetherdiol and/or polyesterdiol having terminal hydroxyl groups and a molecular weight of 400 to 3,000 with (B) a diisocyanate in such a molar ratio that an intermediate product is formed which has terminal isocyanate groups, (C) and reacting the intermediate product with a compound which has two groups which are reactive toward isocyanate groups and at least one group which is capable of forming an anion and which has been neutralized with a tertiary amine before the reaction, converting the second intermediate product, obtained from (A), (B) and (C), into a predominantly aqueous phase and (D) reacting the isocyanate groups which are still present with a diamine and/or polyamine having primary and/or secondary amino groups.

The invention also relates to a substrate which has been coated with a multilayer coating which has been obtained by applying a water-dilutable coating agent which contained pigments and, if desired, flow-control agents, thixotroping agents, fillers, organic solvents and other auxiliaries, by applying a transparent coating agent as a topcoat and by subsequently heating the coated substrate, in which the coating agent for the base layer contained as binder an aqueous polyurethane dispersion having a polyurethane resin acid number of 5 to 70 and having been prepared by reacting (A) a linear polyether diol and/or polyester diol having terminal hydroxyl groups and a molecular weight of 400 to 3,000 with (B) a diisocyanate in such a molar ratio that an intermediate product is formed which has terminal isocyanate groups, (C) and reacting the intermediate product with a compound which has two groups which are reactive toward isocyanate groups and at least one group which is capable of forming an anion and which has been neutralized with a teriary amine before the reaction, converting the second intermediate product, obtained from (A), (B) and (C) into a predominantly aqueous phase and (D) reacting the isocyanate groups which are still present with a diamine and/or polyamine having primary and/or secondary amino groups.

Suitable substrates are articles made of metal, wood, plastics or other materials.

Below, the invention is illustrated in more detail by means of illustrative embodiments, the preparation of polyurethane dispersions being described first.

POLYURETHANE DISPERSION 1

830 g of a polyester formed from neopentylglycol, hexane-1,6-diol and adipic acid and having a hydroxyl number of 135 and an acid number of less than 3 are dehydrated in vacuo at 100° C. in the course of 1 hour. 524 g of 4,4-dicyclohexylmethanediisocyanate are added at 80° C., and the mixture is stirred at 90° C. until the free isocyanate group content is 6.18% by weight, relative to the total original weight. When the mixture is cooled down to 60° C., a solution of 67 g of dimethylolpropionic acid and 50 g of triethylamine in 400 g of N-methylpyrrolidone is added, and the resulting mixture is stirred at 90° C. for 1 hour.

The resulting mass is added with thorough stirring to 2,400 g of cold deionized water. A finely divided dispersion is obtained. 80 g of a 30% strength aqueous solution of ethylenediamine are added with thorough stirring to this dispersion in the course of 20 minutes. The resulting very finely divided dispersion has a solids content of 35% and a DIN cup 4 efflux time of 23 seconds.

POLYURETHANE DISPERSION 2

570 g of a commercially available polyester formed from caprolactone and a glycol and having a hydroxyl number of 196 are dehydrated in vacuo at 100° C. in the course of 1 hour. 524 g of 4,4'-dicyclohexylmethanediisocyanate are added at 80° C., and the mixture is stirred at 90° C. until the isocyanate content is 7.52% by weight, relative to the original total weight. When the mixture has cooled down to 60° C., a solution of 67 g of dimethylolpropionic acid and 50 g of triethylamine in 400 g of N-methylpyrrolidone is added, and the resulting mixture is stirred at 90° C. for 1 hour. The resulting mass is added with thorough stirring to 1,840 g of cold deionized water. 86 g of 15% strength hydrazine solution are added with thorough stirring in the course of 20 minutes to the dispersion obtained. The resulting very finely divided dispersion has a solids content of 35% and a DIN cup 4 efflux time of 27 seconds.

POLYURETHANE DISPERSION 3

500 g of a polypropylene glycol having a hydroxyl number of 112 are dehydrated in vacuo at 100° C. in the course of 1 hour. 262 g of 4,4'-dicyclohexylmethanediisocyanate are added at 80° C., and the mixture is stirred at 90° C. until the isocyanate content is 5.47% by weight, relative to the original total weight.

When the mixture has cooled down to 60° C., a solution of 33.5 g of dimethylolpropionic acid and 25 g of triethylamine in 200 g of N-methylpyrrolidone is added, and the resulting mixture is stirred at 90° C. for 1 hour. The mass thus obtained is added with thorough stirring to 1,650 g of deionized water. 40 g of 15% strength hydrazine solution are then added with stirring in the course of 20 minutes to the dispersion formed. The resulting dispersion has a solids content of 32%, and a DIN cup 4 efflux time of 23 seconds.

POLYURETHANE DISPERSION 4

1,000 g of a polyester formed from neopentylglycol and adipic acid and having a hydroxyl number of 56 are dehydrated in vacuo at 100° C. in the course of 1 hour. 202 g of hexamethylene diisocyanate are added at 80° C., and the mixture is stirred at 90° C. until the isocyanate content is 4.77% by weight, relative to the original total weight. When the mixture has cooled down to 60° C., a solution of 47 g of dimethylolpropionic acid and 35 g of triethylamine in 300 g of N-methylpyrrolidone is added, and the resulting mixture is stirred at 90° C. for 1 hour. The polyurethane material thus obtained is then stirred with thorough stirring into 4,650 g of cold deionized water. 60 g of a 15% strength hydrazine solution are added with stirring in the course of 20 minutes to the dispersion formed. The resulting dispersion has a solids content of 20% and a DIN cup 4 efflux time of 82 seconds.

POLYURETHANE DISPERSION 5

650 g of a commercially available polyether of tetrahydrofuran and which has a hydroxyl number of 173 are dehydrated in vacuo at 100° C. in the course of 1 hour. 533 g of isophorone diisocyanate are added at 80° C., and the mixture is stirred at 90° C. until the isocyanate content is 9.88% by weight, relative to the original total weight. When the mixture has cooled down to 60° C., a solution of 93 g of dimethylolpropionic acid and 70 g of triethylamine in 400 g of N-methylpyrrolidone is added, and the resulting mixture is stirred at 90° C. for 1 hour. The polyurethane material thus obtained is stirred with thorough stirring into 4,700 g of cold deionized water. 120 g of a 15% strength hydrazine solution are then added in the course of 20 minutes to the dispersion formed. The resulting dispersion has a solids content of 19% and a DIN cup 4 efflux time of 27 seconds.

POLYURETHANE DISPERSION 6

Example 2 is followed, except that 800 ml of acetone are used in place of the 400 g of N-methylpyrrolidone. The resulting dispersion is freed from the acetone by vacuum distillation, and a pure aqueous polyurethane dispersion is obtained which has a solids content of 39% and a DIN cup 4 efflux time of 63 seconds.

POLYURETHANE DISPERSION 7

Example 2 is repeated, except that 200 g of a 40% strength aqueous solution of diethanolamine are used in place of the hydrazine solution.

POLYURETHANE DISPERSION 8

Example 2 is followed, except that 100 g of a 40% strength aqueous solution of N-2-hydroxyethyl-diaminoethane are used in place of the hydrazine solution.

PREPARATION OF COATING AGENTS

The composition of the coating agents is shown in Table 1, where the numbers denote parts by weight. The following notes refer to the components listed there:

Thickener 1:
Paste of a sodium magnesium silicate having a layer structure, 3% strength in water.
Thickener 2:
Paste of a sodium magnesium fluorine lithium silicate, 3% strength in water; the paste is prepared by stirring the silicate by means of a dissolver into water for 30–60 minutes, and leaving the mixture to stand overnight. The mixture is stirred once more, for 10 to 15 minutes, the next day.
Thickener 3:
3% strength aqueous paste of a purified bentonite.
Polyester resin:

The water-soluble polyester used is prepared as follows:

A reactor which is equipped with a stirrer, a thermometer and a packed column is charged with 832 parts by weight of neopentylglycol, which are then melted. 664 parts by weight of isophthalic acid are added. The mixture is heated up with stirring in such a way that the temperature at the top of the column does not exceed 100° C. The esterification reaction is carried out at a maximum temperature of 220° C. until an acid number of 8.5 has been reached. When the mixture has cooled down to 180° C., 384 parts by weight of trimellitic anhydride are added, and the esterification reaction is continued until an acid number of 39 has been reached. The mixture is diluted with 425 parts by weight of butanol.

Acrylate resin:

The acrylate resin is prepared as follows:

A reaction vessel which is equipped with a stirrer, a thermometer and a reflux condenser is charged with 400 parts by weight of n-butanol which are then heated to 110° C. A mixture of 1,000 parts by weight of n-butyl methacrylate, 580 parts by weight of methyl methacrylate, 175 parts by weight of 2-hydroxyethyl acrylate and 175 parts by weight of acrylic acid is then metered into the reaction vessel from a supply vessel, and a mixture of 80 parts by weight of t-butyl perbenzoate and 80 parts by weight of n-butanol is metered into the reaction vessel from a second supply vessel, the additions taking 4 hours, being at a uniform rate and simultaneous. During the additions the temperature is maintained at 110°. Afterwards the polymerization reaction is continued at 110° C., and, after 1 hour, a mixture of 10 parts by weight of t-butyl perbenzoate and 10 parts by weight of n-butanol is added. After a further 1.5 hours a polymer solution is obtained which has solids content of 79.7% by weight, an acid number of 64.0, relative to the solids content, and a viscosity of 850 mPa.s as measured in a disk-cone viscometer at a solids content of 60% by weight in n-butanol.

Melamine resin:

Commercially available methanol-etherified melamine/formaldehyde resin, solids content 70% by weight in water.

Aluminum pigment I:

Commercially available aluminum pigment paste, 65% strength in water, average particle diameter 10 μm.

Aluminum pigment II:

Commercially available aluminum pigment paste, 65% strength in universal spirit/solvent naphtha, average particle diameter 10 μm.

Blue pigment:

Indanthrone pigment, Colour Index: Pigment Blue 60/69800.

TABLE 1

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Thickener 1 | — | — | — | 25 | 25 | — | — | — | — | — | — | — | — |
| Thickener 2 | 25 | 25 | 25 | — | — | — | — | 25 | — | — | — | — | 15 |
| Thickener 3 | — | — | — | — | — | 25 | 25 | — | 25 | 25 | 25 | — | — |
| Polyurethane dispersion 1 35% solids content | 25 | — | — | — | — | — | — | — | — | — | — | — | — |
| Polyurethane dispersion 2 35% solids content | — | 25 | — | — | — | — | — | — | — | — | 25 | — | — |
| Polyurethane dispersion 3 32% solids content | — | — | 25 | — | — | — | — | — | — | 25 | — | — | — |
| Polyurethane dispersion 4 20% solids content | — | — | — | 30 | — | — | — | — | — | — | — | — | 20 |
| Polyurethane dispersion 5 19% solids content | — | — | — | — | 30 | — | — | — | — | — | — | 40 | — |
| Polyurethane dispersion 6 39% solids content | — | — | — | — | — | 25 | — | — | — | — | — | — | — |
| Polyurethane dispersion 7 35% solids content | — | — | — | — | — | — | 25 | 30 | — | — | — | — | — |
| Polyurethane dispersion 8 35% solids content | — | — | — | — | — | — | — | — | 25 | — | — | — | — |
| Polyester resin 80% solids content | 5 | 5 | 5 | 5 | — | — | 5 | — | — | 5 | 5 | — | 8 |
| Acrylate resin 80% solids content | — | — | — | — | 6 | 6 | — | — | 5 | — | — | — | — |
| Dimethylethanolamine 10% strength in water | 0.5 | 0.5 | 0.5 | 0.5 | 0.5 | 0.5 | 0.5 | 0.5 | 0.5 | 0.5 | 0.5 | — | 0.6 |
| Melamine resin | 2 | 2 | 2 | 2 | 2 | 2 | 2 | 5 | 2 | 2 | 2 | — | 3 |
| Aluminum pigment I | 5 | 5 | 5 | 5 | 5 | 5 | 5 | 5 | 5 | — | 3 | 5 | — |
| Blue pigment | — | — | — | — | — | — | — | — | — | — | 2 | — | 4 |
| Aluminum pigment II | — | — | — | — | — | — | — | — | — | 5 | — | — | — |
| Titanium dioxide, rutile type | | | | | | | | | | | | | 1 |
| Butylglycol | 5 | 5 | 5 | 5 | 5 | — | 5 | 5 | 5 | 5 | 5 | 8 | 5 |
| Water | 32.5 | 32.5 | 32.5 | 27.5 | 26.5 | 31.5 | 32.5 | 29.5 | 32.5 | 32.5 | 32.5 | 47 | 43.4 |

Specifically, the coating agents are prepared as follows:

EXAMPLES 1 TO 9

The polyurethane dispersion is added with stirring to the thickener used. The remaining components are added with continued stirring. When the mixture has been stirred for 30 minutes, it is brought with water to a DIN cup 4 efflux time of 14 to 15 seconds.

EXAMPLE 10

5 parts of aluminum pigment II are stirred together with 5 parts of butylglycol and 5 parts of polyester resin for 15 minutes. The bentonite paste, the polyurethane dispersion, the dimethylethanolamine solution, the melamine resin and the water are added with continued stirring. When the mixture has been stirred for 30 minutes, it is brought with water to a DIN cup 4 efflux time of 14 to 15 seconds.

EXAMPLES 11 AND 13

The blue pigment and the titanium dioxide are mixed with stirring with the polyester and the butylglycol, and the mixture is dispersed in a sand mill. This pigment paste is mixed with stirring with the remaining components, and further processed in the same way as in Examples 1 to 9.

EXAMPLE 12

The polyurethane dispersion, the aluminum pigment, the butylglycol and the water are mixed, and the mixture is stirred for 30 minutes. It is then brought to a DIN cup 4 efflux time of 14 to 15 seconds.

APPLICATION OF COATING AGENTS

The coating agents obtained are each sprayed onto 4 Bonderite-treated steel panels. The steel panels are air-dried at room temperature for 15 minutes, and unpigmented coating agents (topcoats 1, 2, 3 and 4) are then applied, having been prepared as follows:

Topcoat 1

(a) Preparation of an acrylate copolymer

A reaction vessel which is equipped with a thermometer, a stirrer, a reflux condenser and a dropping funnel is charged with 166 parts of n-butanol, 287 parts of toluene and 1,507 parts of ethylene glycol monoethyl ether acetate. The dropping funnel is charged with a solution of 868 parts of n-butyl methacrylate, 812 parts of methyl methacrylate, 32.8 parts of methacrylic acid, 287.2 parts of hydroxypropyl methacrylate and 40 parts of cumene hydroperoxide. The reaction mixture is heated with stirring, and the monomer/catalyst solution is added from when the solvent temperature has reached 136° C. The monomer/catalyst solution is added in the course of 45 minutes, during which the temperature is maintained between 127° and 136° C. After a further 2 hour period of heating the temperature is 136° C., and the Gardner-Holdt viscosity at 25° C. of a sample which has been reduced to a solids content of 30% with ethylene glycol monoethyl ether acetate is K-L. After a further 2 hour period of heating, at 136.1° to 136.7° C., the viscosity, measured on a sample having a solids content of 30%, is P-Q. The viscosity increases to Q-R in the course of continued heating for 2 hours and 5 minutes. The heating is discontinued, and the polymer solution filtered. The solution obtained has a Gardner-Holdt viscosity of $Z_3$ - $Z_4$ at 25° C., a solids content in the polymerization solvents (84.91% of ethylene glycol monoethyl ether acetate, 5.53% of n-butanol and 9.56% of toluene) of 39.9, a density of 1.009 kg/liter, an acid number relative to the solids content of 17.2, and a Gardner color 1. The relative viscosity of the copolymer is 1.1434.

(b) Preparation of the unpigmented coating agent 144 parts of an acrylate copolymer solution which has a non-volatile content of 45% by weight are mixed with 58 parts of a butylated methylolmelamine resin (solids content 60% by weight). The non-volatiles content of the resulting mixture is reduced to 40% by weight with xylene; a transparent coating composition is thus obtained with a viscosity of 28 to 32 seconds, measured in a No. 4 Ford cup. The viscosity is then adjusted to 17 seconds with a mixture of 60 parts by weight of xylene and 40 parts by weight of butyl acetate.

Topcoat 2

(a) Preparation of an acrylic resin solution

A customary apparatus for preparing an acrylic resin and which is equipped with a stirrer, a thermometer, a reflux condenser and a dropping vessel is charged with 67 parts of petroleum solvent (a crude oil fraction which contains trimethylbenzene and has a boiling range from about 160° C. to 200° C.). When a temperature of 132° C. has been reached, a monomer mixture which consists of 60 parts of n-butyl methacrylate, 19 parts of 2-ethylhexyl methacrylate, 18 parts of hydroxyethyl methacrylate, 3 parts of methacrylic acid and 1.9 parts of $\alpha,\alpha'$-azobisisobutyronitrile is added dropwise in the course of 3 hours.

When the monomer mixture has been added, the mixture is stirred for 1 hour while the temperature of the reactor is maintained at 132° C. A mixture which consists of 10 parts of the above petroleum solvent and 0.8 part of 2,2'-azobis-2,4-dimethylvaleronitrile is then added in the course of 2 hours. The reaction is carried out at 132° C. for 2 hours. 3 parts of the petroleum solvent and 15 parts of n-butanol are then added, to give an acrylic resin solution. The solid resin of the acrylic resin solution has a number average molecular weight (measured by an osmotic vapor pressure method) of 10,200 and a glass transition point (measured by means of a dilatometer) of 20° C. The solution has a solids content of 50.0% and a viscosity (measured with a Gardner bubble viscometer at 25° C.) of K.

(b) Preparation of an unpigmented coating agent

A second unpigmented coating agent (topcoat 2) is prepared by dispersing 140 parts by weight of the above acrylic resin solution, 50 parts by weight of a solution of an n-butanol-modified melamine resin in n-butanol/xylene having a solids content of 60% by weight and 0.1 part by weight of a 1% strength solution of a silicone oil in xylene.

Topcoat 3

(a) Preparation of an acrylate resin 18.4 parts by weight of xylene are heated to 140° C. in a reaction vessel which is equipped with thermometer, a stirrer, a reflux condenser and a dropping funnel. An inert gas atmosphere is used, and a mixture of 7.6 parts by weight of 2-hydroxypropyl methacrylate, 0.6 part by weight of methacrylic acid, 19.7 parts by weight of 2-ethylhexyl acrylate, 11.6 parts by weight of methyl methacrylate and 9.8 parts by weight of n-butyl methacrylate and a mixture of 0.5 part by weight of di-tert.-butyl peroxide and 2.0 parts by weight of xylene are added at a uniform rate with stirring in the course of 4 hours and the temperature of the reaction mixture is maintained at 140° C. The mixture is then stirred at 140° C. for a further half hour, and a mixture of 0.2 part by weight of di-tert.-butyl peroxide and 1.0 part by weight of xylene is slowly added. When a further 30 minutes have elapsed, a solids content of 69.6% (measured on a coating on drying at 180° C. for 15 minutes in a through-circulation dryer) has been reached. The reaction mixture is cooled down from 120° C. and diluted with 28.6 parts by weight of xylene. An acrylate resin solution is obtained which has a solids content of 50% by weight and a viscosity of 560 mPa.s (measured in a disk-cone viscometer) and an acid number of 9.8 (relative to solid resin).

(b) Preparation of an unpigmented coating agent

The unpigmented coating agent is prepared by first preparing a melamine resin solution.

Preparation of a melamine resin

A melamine/formaldehyde condensate resin is prepared using known methods by adjusting a mixture of 630 parts of melamine and 2,435 parts of an aqueous formaldehyde solution (containing 40% by volume of formaldehyde) to a pH value of 7.0 with sodium hydroxide solution and heating at 90° C. until diluting a sample with a volume of water precipitates twice the volume of resin. 1,300 parts of water are then distilled off in vacuo, and 4,000 parts of n-butanol and 500 parts of concentrated hydrochloric acid are added. When the mixture has been maintained at 40° C. for 30 minutes, the etherified product is neutralized with 250 g of sodium carbonate. The butanol-containing layer is separated off and the residue is dehydrated in vacuo and adjusted to a solids content of 60% by distilling off the solvent.

An unpigmented coating agent (topcoat 3) is prepared from 50 parts by weight of the acrylate resin just described, 30 parts by weight of the above melamine resin solution, 15 parts by weight of xylene and 5 parts by weight of butyl acetate.

Topcoat 4

(a) Preparation of a polyester resin

A saturated polyester is prepared from
1.0 mole of hexahydrophthalic anhydride,
0.25 mole of trimethylolpropane,
0.6 mole of ethylbutylpropane-1,3-diol and
0.2 mole of 2,2-methylphenylpropane-1,3-diol.

The above starting materials are weighed in the amounts specified into a reaction vessel which is equipped with a packed column, a descending condenser and a stirrer. 10 g of a relatively high-boiling aromatics fraction (boiling range: 150° C. to 170° C.) are added to the reaction mixture, and the reactor contents are then heated in such a way that the temperature in the reaction vessel does not exceed 105° C. at the top of the packed column. A nitrogen atmosphere is used. After 10 hours the reaction mixture has reached an acid number of 11 and a viscosity of 320 mPa.s (measured on a 60% strength solution in xylene in an ICI disk-cone viscometer). The saturated polyester obtained is dissolved with xylene to give a solution which has a solids content of 60%. The hydroxyl number of the resin is 78.

(b) Preparation of an unpigmented coating agent 30 g of a 55% strength solution of a commercially available reactive partially butanol-etherified melamine/formaldehyde condensation resin in butanol/xylene (2:1) are added to 55 g of the resin solution obtained in (a), and the mixture is diluted with 15 g of a solvent mixture of ethylglycol acetate and butylglycol acetate (1:1), and the contents are thoroughly mixed by stirring. The varnish formed has a solids content of 49% and an efflux time of 43 seconds from the DIN 53,211 efflux cup with a 4 mm outlet nozzle.

After the transparent coating agents have been applied, the two-layer coatings obtained are baked in a through-circulation dryer. The baking conditions were:
Topcoat 1: 30 minutes, 90° C.
Topcoat 2: 20 minutes, 150° C.
Topcoat 3: 30 minutes, 130° C.
Topcoat 4: 30 minutes, 130° C.

The temperatures given refer in each case to the temperature of the article being baked. Two-layer coatings are obtained which have excellent properties.

We claim:

1. A water-dilutable coating agent for preparing the base layer of a multilayer coating and which contains pigments and as a binder an aqueous polyurethane dispersion which has a polyurethane resin acid number of 5 to 70 and which has been prepared by reacting:
   (A) a linear polyether diol and/or polyester diol having terminal hydroxyl groups and a molecular weight of 400 to 3,000 with
   (B) a diisocyanate to form a first intermediate product in such a molar ratio that said first intermediate product is formed which has terminal isocyanate groups;
   (C) and reacting said first intermediate product with a compound which has two groups which are reactive toward isocyanate groups and at least one group which is capable of forming an anion, said compound neutralized with a tertiary amine before the reaction and forming a second intermediate product, converting said second intermediate product, obtained from (A), (B) and (C), into a predominantly aqueous phase; and
   (D) reacting isocyanate groups which are still present with a diamine and/or polyamine having primary and/or secondary amino groups.

2. The coating agent of claim 1, further comprising an additional binder component comprising a water-dilutable melamine resin in an amount of 1 to 80% by weight, relative to the solids content of the polyurethane dispersion.

3. The coating agent of claim 2, wherein the melamine resin content, relative to the solids content of the polyurethane dispersion, is 20 to 60% by weight.

4. The coating agent of claim 2, further comprising as a further binder component a water-dilutable polyester resin and/or a water-dilutable polyacrylate resin, where the weight ratio of melamine resin to polyester and/or polyacrylate resin is 2:1 to 1:4 and the total melamine resin and polyester and polyacrylate resin content, relative to the solids content of the polyurethane dispersion, is 1 to 80% by weight.

5. The coating agent of claim 4, wherein the melamine resin and polyester and polyacrylate resin content is 20 to 60% by weight, relative to the solids content of the polyurethane dispersion.

6. The coating agent of claim 1, further comprising as an additional binder component a blocked polyisocyanate together with a water-dilutable polyester resin and/or a water-dilutable polyacrylate resin, where the polyisocyanate and the polyester resin and/or the polyacrylate resin content is in total 1 to 80% by weight, relative to the solids content of the polyurethane dispersion.

7. The coating agent of claim 6, further comprising 0.5 to 25% by weight of metal pigments relative to the total binder solids content.

* * * * *